United States Patent [19]

Allison et al.

[11] Patent Number: 5,053,949
[45] Date of Patent: Oct. 1, 1991

[54] NO-CHIP DEBUG PERIPHERAL WHICH USES EXTERNALLY PROVIDED INSTRUCTIONS TO CONTROL A CORE PROCESSING UNIT

[75] Inventors: Nigel J. Allison; Rand L. Gray; Jay A. Hartvigsen, all of Austin, Tex.

[73] Assignee: Motorola, Inc., Schaumburg, Ill.

[21] Appl. No.: 332,130

[22] Filed: Apr. 3, 1989

[51] Int. Cl.$^5$ .................. G06F 11/00; G06F 11/30
[52] U.S. Cl. ................... 364/200; 364/239.2; 364/254.8; 364/967
[58] Field of Search ................... 371/16, 17, 18; 364/200 MS File, 900 MS File

[56] References Cited

U.S. PATENT DOCUMENTS

| | | | |
|---|---|---|---|
| 4,231,087 | 10/1980 | Hunsberger et al. | 364/200 |
| 4,312,066 | 1/1982 | Bantz et al. | 371/16 |
| 4,338,660 | 7/1982 | Kelley et al. | 364/200 |
| 4,349,870 | 9/1982 | Shaw et al. | 364/200 |
| 4,419,756 | 12/1983 | Cheng-Quispe et al. | 364/900 |
| 4,441,154 | 4/1984 | McDonough et al. | 364/200 |
| 4,463,421 | 7/1984 | Laws | 364/200 |
| 4,486,827 | 12/1984 | Shima | 364/200 |
| 4,667,285 | 5/1987 | Suzuki et al. | 364/200 |
| 4,670,838 | 6/1987 | Kawata | 364/200 |
| 4,674,089 | 6/1987 | Poret et al. | 371/25 |
| 4,677,586 | 6/1987 | Magar et al. | 364/900 |
| 4,703,446 | 10/1987 | Momose | 364/580 |
| 4,710,927 | 12/1987 | Miller | 371/15 |
| 4,809,167 | 2/1989 | Pawloski et al. | 364/200 |
| 4,837,764 | 6/1989 | Russello | 371/20 |

OTHER PUBLICATIONS

Embedded Bliss for Emulation, Huffman et al., 02-0-1-87, Electronic Products pp. 20–21.

Primary Examiner—Thomas C. Lee
Assistant Examiner—Krisna Lim
Attorney, Agent, or Firm—Charlotte B. Whitaker

[57] ABSTRACT

A data processing system having a debug peripheral is provided. The debug peripheral is coupled to a central processing unit and memory via an internal communications bus. The debug peripheral is a single-word dual port memory with parallel read-write write access on one side, and synchronous, full-duplex serial read-write access on the other side. The serial side of the debug peripheral is connected to external emulation hardware by means of a three-pin synchronous serial interface. The parallel access is via a connection to a core central processing unit (CPU) internal communications bus. The debug peripheral is addressed at sixteen adjacent locations in the CPU memory space. During a debug interlude, the debug peripheral assumes control of the CPU by providing an interrup signal to the CPU, and thereby causing the CPU to fetch instructions directly from the debug peripheral. The debug peripheral receives instructions from the external emulation hardware, and provides the debug instructions to the CPU, in response to an instruction address provided by the CPU.

15 Claims, 2 Drawing Sheets

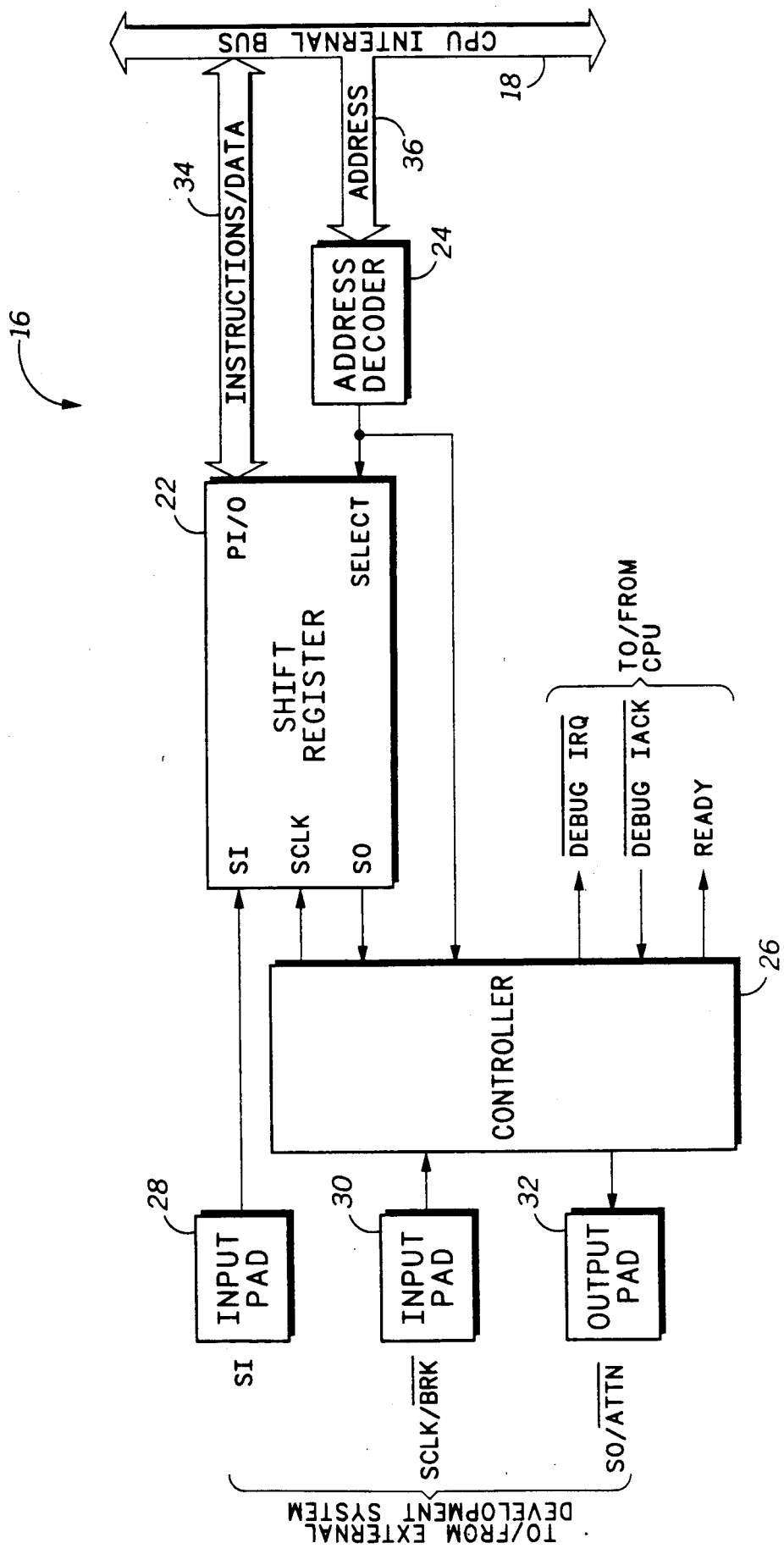

NO-CHIP DEBUG PERIPHERAL WHICH USES EXTERNALLY PROVIDED INSTRUCTIONS TO CONTROL A CORE PROCESSING UNIT

FIELD OF THE INVENTION

This invention relates to development systems tools, and more particularly to a standard debug peripheral for providing development systems support.

BACKGROUND OF THE INVENTION

Today's high-performance microprocessors and microcomputers place ever increasing demands on the development system tools used for debugging these sophisticated integrated circuits. Moreover, the increasing variety of standard and custom/core microcomputer (MCU) designs, necessitates a fundamental change in the design of development system tools. New microprocessors (MPU), designed to operate at clock speeds upwards of 33 MHz, push development system technology to its limit. Meanwhile, the widespread usage of existing central processing unit (CPU) designs for the processor core in MCUs imposes constraints on the design of development system tools. As the design cycle for these standard and custom/core MCUs shortens, concurrent availability of development system tools becomes increasingly problematic. Consequently, the problem is one of timely availability of high performance development system tools to support the wide variety of microprocessors and microcomputers entering the marketplace.

The traditional design approach for development system support relies upon in-circuit emulation to debug the MCU/MPU prototype software/hardware. Typically, in-circuit emulation allows the software designer to trace the execution of the software by stopping the program execution, at various intervals, and examining the contents of the internal registers, memory locations, and the like. In some designs the in-circuit emulator operates in a foreground and background mode, whereby the emulator processes the application program (non-emulation) in the foreground mode and the debugging program (emulation) in the background mode. Accordingly, the in-circuit emulator switches banks between foreground and background memory space during the execution and debugging of the user program, therefore, the MCU must operate in an expanded mode, necessitating the reconstruction of I/O ports which are lost to the external bus interface. Generally, the switch back and forth between the foreground (user) and background (debugging) memory banks requires substantial amounts of external buffer circuitry, to facilitate the operation of the MCU in an expanded mode. Often this additional buffer circuitry degrades the performance of the emulator, and thus prevents real-time circuit emulation. Since the implementation of the foreground/background memory bank switch requires a substantial amount of external circuitry, an emulator pod is used rather than a small daughter-board probe. The design of the resultant emulator pod is time consuming, and costly due to the required development system engineering expenses.

In the prior art, system designers employed port-replacement devices or bond out devices, in an effort to reduce the amount of external circuitry required. The primary disadvantage of using a port-replacement or bond out device is the requirement for additional design and maintenance resources. Essentially, the system designer must allocate design resources for the port-replace or bond out device, in addition to those resources required for the MCU/MPU design. Yet another approach, disclosed in Vaglica et al. U.S. Ser. No. 115,479 filed Oct. 30, 1987, is to integrate a background mode into the CPU core. This solution is optimal in some cases, however, it is often infeasible to make anything other than minor modifications to existing CPU cores.

SUMMARY OF THE INVENTION

An object of the present invention is to provide an improved development system support for a wide variety of integrated circuit designs.

Another object of the present invention is to provide the capability for background mode processing in an existing CPU core without modification to the core design.

Yet another object of the present invention is to provide real-time in-circuit emulators for MCUs or MPUs of arbitrarily high clock speeds.

Yet another object of the present invention is to provide a method for substantially reducing the design cycle time for development systems tools.

These and other objects of the present invention are achieved in a data processing system comprising: a processor for executing a first sequence of instructions received by the processor, in response to a first sequence of instruction addresses, and for executing an alternate sequence of externally provided instructions received by the processor, in response to an alternate sequence of instruction addresses; an internal communications bus coupled to the processor; a memory coupled to the internal communications bus for storing a plurality of instructions and for providing the first sequence of instructions to the processor, in response to the first sequence of instruction addresses received from a processor; and a debug peripheral coupled to the internal communications bus for storing information received from the processor, and for providing the externally provided instructions to the processor, comprising: serial means for receiving the alternate sequence of externally provided instructions, in a first debug mode, and for providing the information received from the processor to an external source, in a second debug mode; parallel means for providing the alternate sequence of externally provided instructions to the processor, in the first debug mode, and for receiving the information from the processor, in the second debug mode.

BRIEF DESCRIPTION OF THE DRAWINGS

FIG. 2 is a block diagram illustrating a preferred embodiment of the internal architecture of the debug peripheral.

DESCRIPTION OF THE INVENTION

Figure 1:
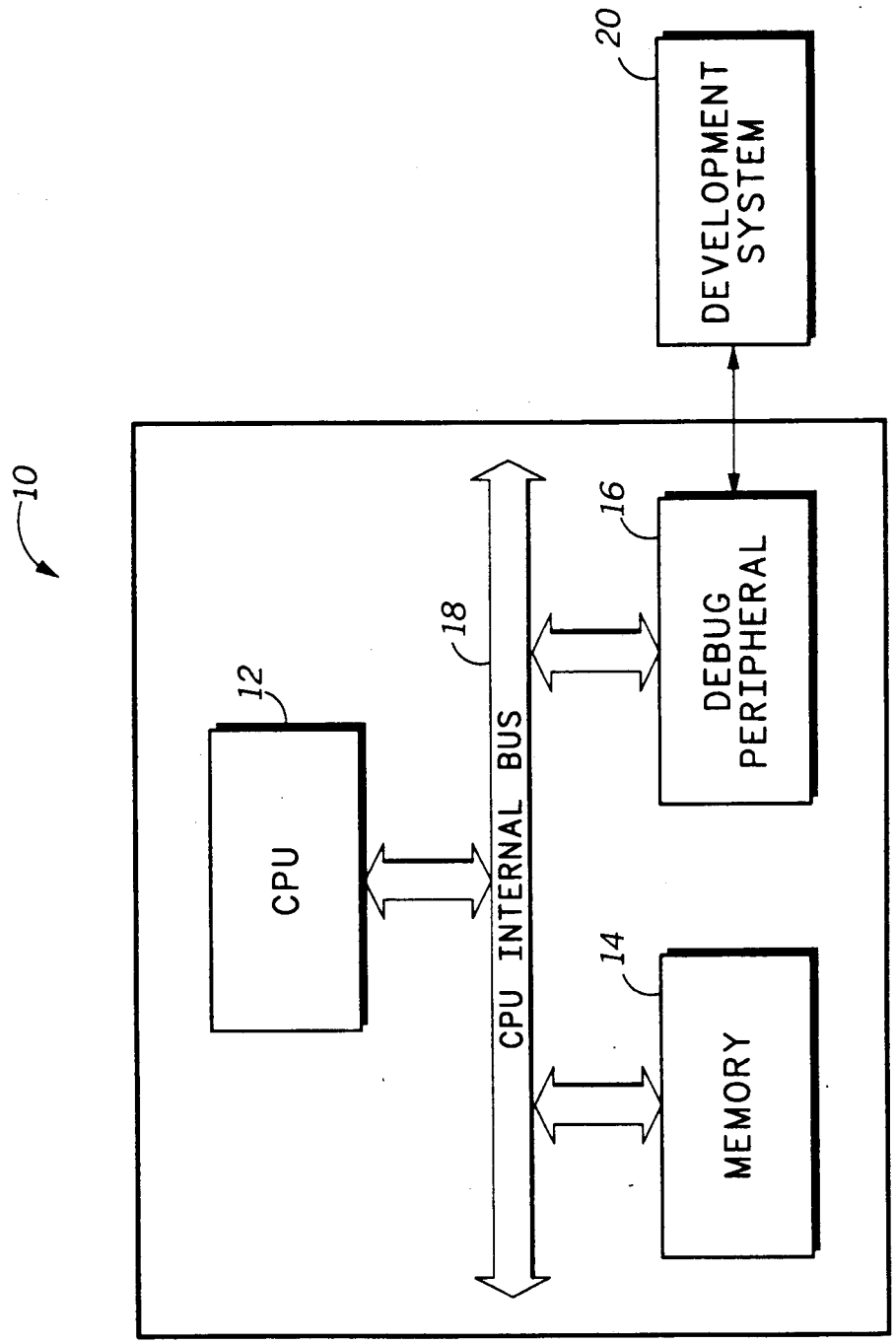
FIG. 1 is a block diagram illustrating a preferred embodiment of a core integrated circuit data processing system.

The terms "assert", "assertion", "negate" and "negation" will be used to avoid confusion when dealing with a mixture of "active high" and "active low" signals. "Assert" and "assertion" are used to indicate that a signal is rendered active, or logically true. "Negate" and "negation" are used to indicate that a signal is rendered inactive, or logically false.

Shown in FIG. 1 is a block diagram of a core integrated circuit (IC) data processing system 10, according to a preferred embodiment of the present invention. The data processing system 10 is comprised generally of a central processing unit (CPU) 12, a memory 14, and a debug peripheral 16. A CPU internal bus 18 facilitates the communication between the CPU 12, and the debug peripheral 16, and memory 14. A development system 20 operates in conjunction with data processing system 10, to assist in the "debugging" of the software and hardware of data processing system 10. The external emulator circuitry of the development system 20 allows the user to perform various functions, such as the insertion of and response to breakpoints, halting the execution of the CPU 12 to examine and alter the contents of various internal registers, and to trace software execution.

In the preferred embodiment, data processing system 10 operates in two modes, a user mode and a debug mode. In the user mode, data processing system 10 operates in a conventional manner. The CPU 12 fetches an instruction from the memory 14, decodes the instruction, executes the instruction, and fetches the next instruction in the sequence for execution. Typically, the execution of the program continues in a sequential manner until CPU 12 receives a conditional instruction or an interrupt. The manner in which the CPU 12 handles an interrupt is a function of the processor design. Generally, the occurrence of an interrupt causes CPU 12 to suspend its normal operation, and commence executing an exception processing or interrupt service routine. In the present invention, CPU 12 enters the debug (emulation) mode in response to an interrupt request, which may be the result of an internal event recognizer, or from an external source, such as the development system 20. During emulation (debug mode), CPU 12 fetches instructions from the debug peripheral 16, rather than the memory 14. Accordingly, CPU 12 suspends execution of the user (application) program, stored in memory 14, and commences executing instructions received from debug peripheral 16. Essentially, the debug peripheral 16 functions as an alternate memory in the data processing system 10.

Shown in FIG. 2 is a block diagram illustrating a preferred embodiment of the internal architecture of the debug peripheral 16. Debug peripheral 16 is a single-word, dual port memory, with parallel read-write access on one side, and synchronous, full-duplex serial read-write access on the other side. In the preferred embodiment, debug peripheral 16 is comprised of a shift register 22, an address decoder 24, and a controller 26. The serial side of debug peripheral 16 is connected to the development system 20 via serial input pad (SI) 28, serial clock/breakpoint input pad (SCLK/BRK*) 30, and serial output/attention pad (SO/ATTN*) 32, which provide respective signals SERIAL IN, SCLK/BRK*, and SERIAL OUT/ATTN*. Accordingly, the SERIAL IN, SCLK/BRK* and SERIAL OUT/ATTN* signals control the serial transfer of data between the debug peripheral 16 and the development system 20. Parallel access to the debug peripheral 16 is provided by the connection of the instruction/data bus 34 to the CPU internal bus 18, and the debug peripheral 16 is essentially accessed in the same manner as any other on-chip peripheral. Since the instructions may be several words in length, the debug peripheral 16 is addressed at 16 adjacent locations in the CPU 12 memory space. For convenience, the initial address of the debug peripheral 16 is hereafter referred to as DEBUG, and thus, the addresses at which CPU 12 may access the debug peripheral 16 are DEBUG to DEBUG+$F.

Data processing system 10 enters the debug mode upon the occurrence of a breakpoint condition, which results in an interrupt to the CPU 12. The breakpoint may be the result of the assertion of the BRK signal externally (by development system 20), or the result of an internal event recognizer consisting of a register and comparator (not shown). In the case where the interrupt is caused by an external BRK signal, controller 26 responds by asserting a debug interrupt request (DEBUG IRQ*) signal to CPU 12. The controller 26 places the DEBUG IRQ* signal on the CPU internal bus 18, causing the CPU 12 to respond, by asserting a debug interrupt acknowledge signal (DEBUG IACK*), and begin execution of a debug interrupt service routine. CPU 12 autovectors to the debug peripheral 16, at address DEBUG, by placing the DEBUG address on the CPU internal bus 18. In response to receiving the DEBUG address, address decoder 24 enables shift register 22, via a SELECT input signal.

CPU 12 begins an instruction fetch cycle, from the debug peripheral 16, at address DEBUG. As the instruction cycle begins, the shift register 22 responds by asserting a serial out (SO) signal. The controller 26, which is coupled to the shift register 22, receives the SO signal and asserts the ATTN* signal, thereby indicating that the peripheral requires attention, and notifying the development system 20 of the commencement of the debug instruction cycle. Essentially, the start of the instruction fetch cycle is reflected externally by driving the SO pin from its quiescent high level to a low level. The development system 20 responds by writing an instruction, from the CPU 12 instruction set, into the shift register 22, via SI input 28. The controller 26 receives the SCLK signal from the development system 20, and provides the SCLK signal to the shift register 22. Consequently, the instruction provided by the development system 20 is clocked, with the SCLK signal, into the shift register 22 via the SI input pad 28. As the data is written into the shift register 22, any previous write which the CPU 12 made to the debug peripheral 16 may be simultaneously shifted out, to development system 20, via the SO output pad 32. Consequently, if the CPU 12 performs a write to the debug peripheral 16 before fetching the current instruction or data resident in the debug peripheral 16, the CPU 12 will invalidate the current word in debug peripheral 16. In the event that this occurs, the debug peripheral 16 will notify the development system 20, via a status bit in the serial out stream, to reload that word.

Once the instruction is fully assembled in the shift register 22 (without error), the current instruction is placed on the instruction/data bus 34, via the parallel I/O port. The controller 26 then asserts a READY signal, thereby notifying the CPU 12 that the instruction may be transferred. CPU 12 transfers the instruction from the instruction/data bus 34, and completes the instruction fetch cycle. CPU 12 proceeds with execution of the instruction. In order to keep the program execution within 16 byte DEBUG address space, the subsequent instruction fetched by CPU 12 is either a jump or branch instructions back to DEBUG. The design of the addressing scheme is such that each of the 16 adjacent addresses refers the CPU 12 back to the shift register 22 of debug peripheral 16. Thus, the CPU 12 continues to fetch instructions from debug peripheral 16 at the designated addresses DEBUG to $F, until the debug interlude is complete, and the user wishes to resume executing the application code. Consequently, the mode of operation, normal or debug, is transparent to the CPU 12 since in either mode of operation (normal or debug) the CPU 12 executes the same instruction set. Essentially, the CPU 12 can not discern the difference between the instruction types in either mode of operation. Upon termination of the debug interlude, the final instruction written into debug peripheral 16, via SI input pad 28, is a return from interrupt. The instructions executed during the duration of the debug interlude are used to read and write internal registers, memory, or for any other operation associated with system debugging. Accordingly, the development system 20 may implement the usual in-circuit emulation primitives, including the insertion of and response to breakpoints, halting the execution of the data processor to examine the contents of system registers, and tracing software execution.

The serial protocol for debug peripheral 16 supports a simple error detection by employing start, stop, and parity bits. The protocol requires N+7 bits per transfer, therefore, the serial clock is counted by the development system 20 to provide the N+7 clocks required to complete the transfer. The following table illustrates the function of each bit in the serial in and out bit streams.

TABLE 1

| | SERIAL PROTOCOL | | |
|---|---|---|---|
| SI BIT | DESCRIPTION | SO BIT | DESCRIPTION |
| Start | Always low | Start | Always low |
| Null | Place Holder | Status 0 | 0 = request retransmission |
| Null | Place Holder | Status 1 | 0 = request new data word |
| Null | Place Holder | Status 2 | 0 = outbound data is valid |
| Status | 0 = inbound data is valid | Status 3 | 0 = bus error on previous access |
| Data 0 | | Data 0 | |
| Data 1 | | Data 1 | |
| . | | . | |
| Data N−1 | | Data N−1 | |
| Parity | | Parity | |
| Stop | Always high | Stop | Always high |

Debug peripheral 16 eliminates the need for large amounts of complex, external emulator circuitry, therefore, the size of the emulation probe is substantially reduced in size. The probe may be a daughter board which plugs directly into or clips onto the MCU/MPU, in the user's circuit board. For example, a typical emulation probe with dimensions 9×12×2 inches is reduced to 3×4×1 inches (or less) by using the debug peripheral 16. The elimination of the emulator cable, generally required in conventional in-circuit emulators, alleviates the need to completely buffer the processor. The reduction in the amount of buffer circuitry facilitates real-time emulation with high-speed MPU/MCU chips, without significant timing degradation.

The debug peripheral 16 provides a load path to the on-chip memory 14 (RAM), thereby eliminating the need for a bootstrap ROM. When the BRK* input signal is asserted, upon the negation of the RESET signal (not shown) of the CPU 12, the CPU 12 will fetch its first instruction from the debug peripheral 16. This feature allows the development system 20 to write any program into the on-chip memory 14, via the shift register 22 of the debug peripheral 16. Once the program is loaded, the debug peripheral 16 may pass control to the program.

The debug peripheral 16 enhances the testability of the MCU/MPU under test in a variety of ways. For example, the contents of a masked ROM may be verified through the serial interface, without entering any special test mode. Furthermore, processor register, on-chip RAM, and other on-chip peripherals may be tested without the need for entering a special test mode. Accordingly, the debug peripheral 16 provides a flexible, efficient standard design, which is easily ported from one integrated circuit to another, at a minimum cost.

While the invention has been described in a preferred embodiment, it will be apparent to those skilled in the art that the disclosed invention may be modified in numerous ways and may assume many embodiments other than that specifically set out and described above. For example, CPU 12 can obtain the interrupt vector directly from the debug peripheral 16, as opposed to the preferred embodiment, wherein the interrupt signal causes the CPU 12 to autovector to the address (DEBUG) of the debug peripheral 16. Accordingly, it is intended by the appended claims to cover all modifications of the invention which fall within the true spirit and scope of the invention.

We claim:

1. A data processing system comprising:
   a processor for executing a first sequence of instructions received by the processor, in response to a first sequence of instruction addresses, and for executing an alternate sequence of externally provided instructions received by said processor, in response to an alternate sequence of instruction addresses;
   an internal communications bus coupled to said processor;
   a memory coupled to said internal communications bus for storing a plurality of instructions and for providing said first sequence of instructions to said processor, in response to said first sequence of instruction addresses received from said processor; and
   a debug peripheral, coupled to said internal communications bus for assuming control of said processor in response to a first control signal received from an external source, said debug peripheral receiving said alternate sequence of externally provided instructions from said external source, and providing said alternate sequence of externally provided instructions to said processor, said debug peripheral further storing information received from said processor and providing information to said external source, comprising:
      serial interface means for receiving said alternate sequence of externally provided instructions in response to said first control signal, and for providing said information received from said processor to said external source in response to a second control signal, in said debug mode;
      parallel interface means for providing said alternate sequence of externally provided instructions to said processor, and for receiving said information from said processor, in said debug mode, said parallel interface means also receiving said alternate sequence of instruction addresses from said processor.

2. The data processing system of claim 1 wherein said debug peripheral provides said alternate sequence of externally provided instructions to said processor in response to said alternate sequence of instruction addresses provided by said processor.

3. The data processing system of claim 2 wherein the debug peripheral further comprises:
   a parallel communications bus;
   a serial communications bus;
   control means for assuming control of said processor by providing a debug interrupt signal to said processor, in response to said first control signal, and for receiving information and providing said information to an external source;
   register means for storing information received from said processor, and for storing said alternate sequence of instructions received from said external source; and
   address decoder means coupled to said internal bus for enabling said register means, in response to said alternate sequence of instruction addresses received from said processor, said alternate sequence of instruction addresses corresponding in number to a predefined number of memory addresses designated for said debug peripheral.

4. The data processing system of claim 3 wherein said externally provided instructions are serially clocked into said register means, via said serial communications bus, in response to a serial clock signal provided to said register means by said control means, to allow said processor to fetch said externally provided instructions from said register means.

5. In a data processing system having a data processor for executing a first sequence of instructions received from an instruction memory, via an internal communications bus, and for executing a sequence of debugging instructions received from a debug peripheral, via said internal communications bus, said debug peripheral comprising:
   a plurality of external terminals;
   a parallel communications bus coupled to said internal communications bus;
   control means, coupled to at least one of said plurality of external terminals, for receiving a debug initiation signal from an external source, and for assuming control of said processor, by providing a debug interrupt signal to said processor, in response to said debug initiation signal;
   register means for storing information, comprising:
      a serial interface, coupled to an external source via at least one of said plurality of external terminals, for receiving said externally provided debugging instructions, and for simultaneously providing data received from said processor, to said control means, in a debug mode;
      a parallel interface, coupled to said processor via said parallel communications bus, for providing said externally provided debugging instructions to said processor, and for receiving data from said processor, in said debug mode; and
   address decoder means, coupled to said parallel communications bus and said register means, for enabling said register means, in response to an alternate sequence of instruction addresses received from said processor, via said parallel communications bus, said alternate sequence of instruction addresses corresponding in number to a predefined number of memory addresses designated for said debug peripheral.

6. The data processing system of claim 5 wherein said externally provided debugging instructions are synchronously loaded into said register means via at least one of said plurality of external terminals, and said processor fetches said externally provided debugging instructions from said register means.

7. The data processing system of claim 6 wherein said data provided by said processor to said register means is serially transferred to said external source, via said control means, contemporaneously with said serial loading of said debugging instructions into said register means via at least one of said plurality of external terminals.

8. The data processing system of claim 7 wherein said processor transfers data directly to said register means via said parallel communications bus.

9. A data processing system comprising:
   a processor for executing a first sequence of instructions received by the processor, in response to a first sequence of instruction addresses, and for executing an alternate sequence of externally provided instructions received by the processor, in response to an alternate sequence of instruction addresses;
   a processor internal communications bus coupled to said processor;
   a memory coupled to said processor internal communications bus for storing a plurality of instructions and for providing said first sequence of instructions to said processor, in response to said first sequence of instruction addresses received from said processor; and
   a debug peripheral, coupled to said processor internal communications bus for assuming control of said processor, in response to a first control signal provided by an external source, said debug peripheral receiving said alternate sequence of externally provided instructions from said external source, and for providing said alternate sequence of externally provided instructions to said processor, in response to said alternate sequence of instruction addresses, said debug peripheral further storing data received by said processor and providing data to said external source, comprising:
      a plurality of external terminals;
      control means, coupled to at least one of said plurality of external terminals, for assuming control of said processor by providing a debug interrupt signal to said processor, in response to said first control signal;
      register means, coupled to said processor internal communications bus and said control means, for storing information, comprising:
         serial communications means, coupled to said external source via at least one of said plurality of external terminals, for receiving said alternate sequence of externally provided instructions, and for providing data received from said processor to said control means, in said debug mode;
         parallel communications means, coupled to said processor internal communications bus, for providing said alternate sequence of externally provided instructions to said processor, and for receiving data from said processor, in said debug mode; and
      address decoder means coupled to said processor internal bus for enabling said register means, in response to said alternate sequence of instruction addresses received from said processor, said alternate sequence of instruction addresses corresponding in number to a predefined number of memory addresses designated for said debug peripheral.

10. The data processing system of claim 9 wherein the processor fetches said alternate sequence of instructions from said debug peripheral and transfers information to said debug peripheral, in response to said debug interrupt signal.

11. The data processing system of claim 9 wherein the control means of said debug peripheral receives data from said processor, via said register means, while said alternate sequence of instructions are synchronously loaded into said register means, from said external source, via at least one of said plurality of external terminals.

12. A data processing system comprising:
a central processing unit comprising:
execution means for executing instructions;
fetching means coupled to the execution means for fetching instructions from a memory, and for providing said instructions to said execution means;
sequencing means coupled to said fetching means for determining a sequence of instruction execution and for providing instruction addresses to said fetching means;
interrupt means coupled to said sequencing means for receiving an interrupt signal and for causing the sequencing means to provide a particular address to said fetching means;
a processor internal bus coupled to said fetching means of said central processing unit; and
a debug peripheral, coupled to the processor internal bus, for assuming control of said central processing unit, in response to a debug initiation signal provided by an external source, said debug peripheral, comprising:
register means coupled to at least one of a plurality of external terminals for serially receiving information from said external source, said register means also coupled to said processor internal bus;
address decode means for responding to said particular address by causing the register means to provide information to said fetching means of said central processing unit;
interrupt signal generation means for providing said interrupt signal to said interrupt means of said central processing unit, in response to said debug initiation signal.

13. The data processing system of claim 12 wherein the debug peripheral further comprises:
debug initiation means coupled to at least one of said plurality of external terminals for receiving said debug initiation signal and for causing said interrupt signal generation means to assume control of said central processing unit, by providing said interrupt signal to said interrupt means of said central processing unit, in response thereto.

14. The data processing system of claim 12 wherein the central processing unit further comprises:
operand write means coupled to the execution means and to the internal communications bus for writing information into said register means of said debug peripheral.

15. The data processing system of claim 12 wherein the register means transfers said information received from said processor to said external source, via said debug initiation means, while said external source contemporaneously loads a debug instruction into said register means.

* * * * *